United States Patent [19]

Goldsborough et al.

[11] 4,114,156

[45] Sep. 12, 1978

[54] FREQUENCY SHIFT RATE DETECTOR

[75] Inventors: Robert R. Goldsborough, Sunnyvale; David R. Spencer, San Jose; Samuel F. West, Sunnyvale, all of Calif.

[73] Assignee: The United States of America as represented by the Secretary of the Army, Washington, D.C.

[21] Appl. No.: 176,890

[22] Filed: Feb. 28, 1962

[51] Int. Cl.² ............................................. G01S 11/00
[52] U.S. Cl. ................................ 343/112 S; 324/162
[58] Field of Search .................... 343/8, 9, 7.7, 112 S, 343/100 CL; 324/162

[56] References Cited

U.S. PATENT DOCUMENTS

| | | | |
|---|---|---|---|
| 2,896,162 | 7/1959 | Berger et al. | 343/100 CL X |
| 3,032,715 | 5/1962 | Frye | 324/162 X |
| 3,089,029 | 5/1963 | Brinker | 343/8 X |
| 3,453,625 | 7/1969 | Zakheim et al. | 343/112 S |

Primary Examiner—Maynard R. Wilbur
Assistant Examiner—Richard E. Berger

Attorney, Agent, or Firm—Nathan Edelberg; Robert P. Gibson; Milton W. Lee

EXEMPLARY CLAIM

2. A doppler shift rate detector system comprising: a first mixer; input means for simultaneously applying a carrier signal and a doppler shifted sideband signal to said first mixer; first and second intermediate frequency amplifiers coupled to said first mixer; a mixer and an intermediate frequency amplifier stage coupled to said first and second intermediate frequency amplifiers; a mixer and oscillator stage coupled to said mixer and intermediate frequency amplifier stage; a frequency multiplier coupled to said mixer and oscillator stage; a second mixer coupled to said frequency multiplier; a delay line having an input coupled to said frequency multiplier and an output coupled to said second mixer, a narrow-band active filter coupled to said second mixer; an indicating means coupled to said filter; a low frequency switch coupled to said filter; a R. F. switch coupled to said first and second intermediate amplifiers; a sweep generator coupled to said R. F. switch and to said low frequency switch; and a variable frequency oscillator coupled between said sweep generator and said first mixer.

3 Claims, 2 Drawing Figures

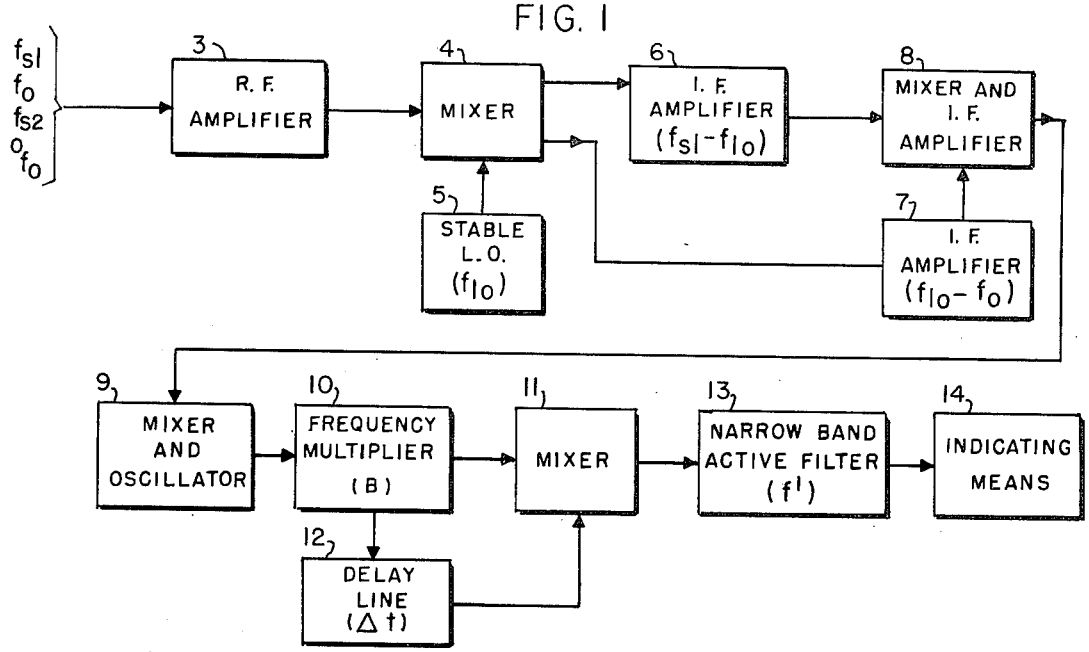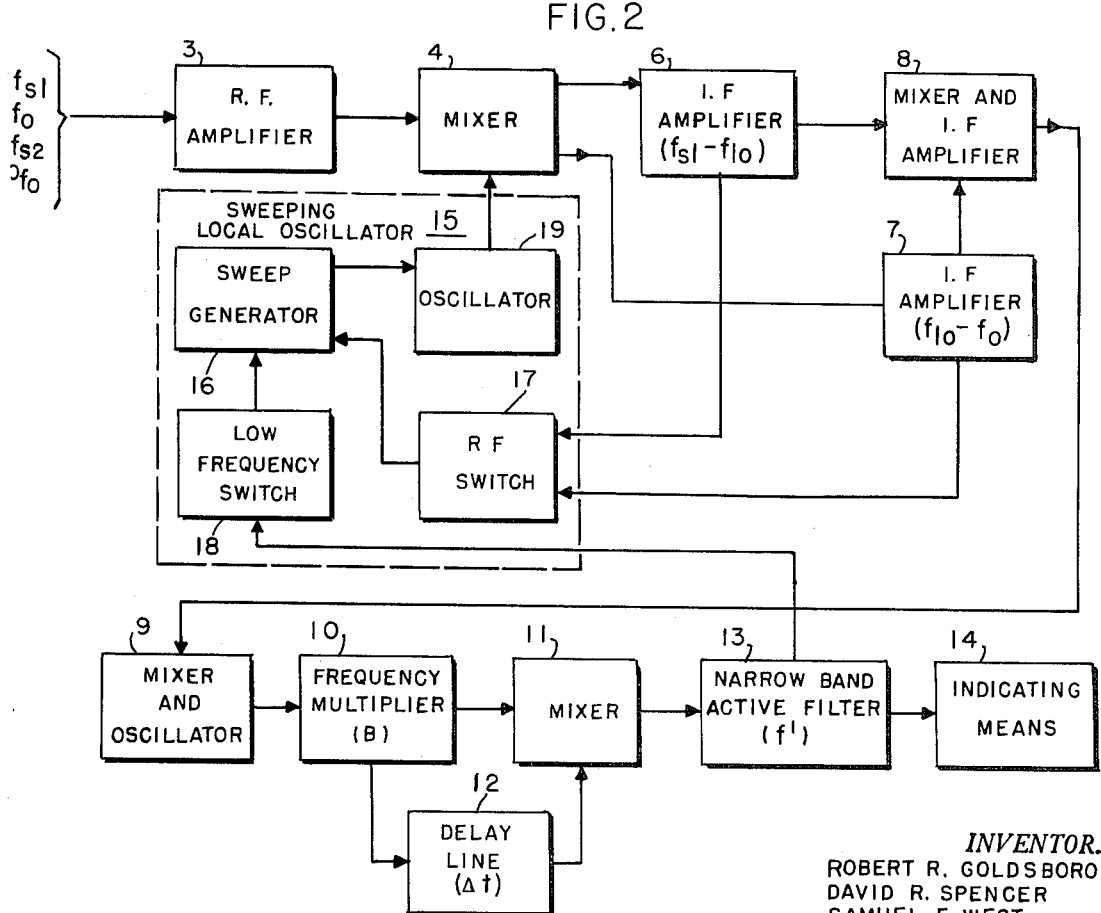

FREQUENCY SHIFT RATE DETECTOR

The present invention relates to a frequency shift rate detector and more particularly to means for detecting the presence of doppler signals exhibiting small magnitudes of frequency shift rate.

There exists in the countermeasures field an urgent need for a radar and/or super high frequency (SWF) radio surveillance system which can detect the presence of doppler rate signals exhibiting small magnitudes of frequency shift rate as a distinguishing characteristic. The primary zone of application is the detection and identification of ballistic type missiles which employ Radio Command-Doppler type guidance systems and in which an airborne beacon acts as a transponder upon receipt of guidance commands and measurements.

Several individual methods of operation exist in Radio Command-Doppler systems and may be categorized as follows:

(a) Modulation of a crystal controlled beacon carrier by a signal related in some distinct manner to the ground transmitted signal. Such modulating signals can be ground transmitted carrier modulation patterns or harmonics thereof or submultiples of the carrier frequency of the ground guidance signal.

(b) Frequency offset operation in which beacon frequency differs from ground guidance frequency by some constant value.

(c) Frequency multiplication and retransmission of beacon received signals.

(d) Combined use of (a) and (b).

(e) Combined use of (a) and (c).

The more important inherent problems in detection and positive identification of signals of this type are:

(1) The absence of a fixed frequency reference from which to measure the rate of frequency shift of the particular received signal components. In the case of surveillance from a distance, direct frequency measurements of the ground based source are impossible due to line-of-sight limitations.

(2) The extremely low rate of frequency shift of the particular received signal. This would normally impose prohibitive stability requirements upon the surveillance system local oscillator(s).

An object of the present invention is to provide a system for detecting ballistic missiles at extreme ranges.

Another object of the present invention is to provide means for detecting missiles and determining their acceleration.

Still another object of the present invention is to provide a doppler shift rate measurement means for accomplishing the aforementioned objects.

To achieve the above objects a passive detection system (referred to herein as a "Frequency Shift Rate Detector") which appears to be immune to deception methods and which, by means of relatively simple circuitry, is capable of detecting signals of the types above outlined, has been devised. It is capable of solving the intercept problem, not only at a particular spot frequency, but also over a relatively wide frequency band. Prior to the conception of this system, no known methods have been employed to accurately determine doppler shift or doppler shift rate in the absence of a reference frequency.

In the "Frequency Shift Rate Detector" the carrier and one side-band signal are mixed with a signal from a local oscillator, the frequency of the local oscillator being between the carrier and side-band frequency, to develop two I.F. signals, one being the difference between the side-band and local oscillator frequency and the other being the difference between the local oscillator and the carrier frequency. These two I.F. signals are mixed, giving an I.F. signal at a frequency the difference between the side-band and carrier frequency to eliminate the effect of oscillator drift. Any doppler shift present will be passed along with this I.F. signal to a third mixer where it is reduced in frequency, so that the doppler shift will be a greater percentage of the total frequency of the signal. The reduced frequency signal is next frequency multiplied. A first portion of the frequency multiplied output is passed directly to a final mixer while a second portion is delayed before being passed to the final mixer. The frequency multiplying is to permit the use of existing ultrasonic delay lines. The output signal (comparison of delayed and nondelayed signal) from the final mixer represents the doppler shift rate.

The frequency shift rate detector described herein provides several distinct advantages in the detection and identification of doppler shift and doppler rate shift. They are as follows:

(1) Determination and measurement of extremely small rates of frequency change are made possible.

(2) Measurement is permitted in the absence of a fixed frequency reference.

(3) As a result of (2) above, measurement may be accomplished from extreme ranges, thus eliminating line of sight requirements to all components except the doppler signal generating device.

(4) Rigid local oscillator stability requirements are eliminated by utilizing an IF sum signal rather than an IF difference signal. As a result, measurement accuracy is independent of oscillator stability.

The exact nature of this invention as well as other objects and advantages thereof will be readily apparent from consideration of the following specification taken in connection with the following drawings in which:

FIG. 1 is a block diagram of the frequency shift rate detector of the present invention useful for single frequency surveillance; and FIG. 2 is a similar block diagram for a wideband detector using a swept frequency local oscillator.

The operation of the system, shown in FIG. 1, will be considered as it applies to signals of the type outlined in (a) above. The missile that is to be detected contains a transponder having a crystal controlled oscillator of frequency $f_0$. The output of this oscillator is modulated by a signal from the ground control station. Due to the modulating signal the output of the transponder is a signal composed of a carrier at frequency $f_0$ and lower and upper sidebands at frequencies $f_{s1}$ and $f_{s2}$ respectively. This modulated signal is transmitted back to the ground control station from the missile. At the ground control station the signal from the missile is detected and one of the sidebands is retransmitted to again modulate the carrier in the missile. This process is continuously repeated and the end result is that the signal AT THE MISSILE is one whose carrier remains constant while its side-bands undergo a doppler shift due to the relative motion of the missile and ground control station. The rate of the doppler shift is a function of the acceleration of the missile with respect to the ground station. Thus, the signal at the missile is composed of a carrier at frequency $f_0$ and lower and upper side-bands at frequencies $f_{s1}$ and $f_{s2}$, respectively, that are doppler shifted at a rate $°f_o$.

Referring now directly to FIG. 1, the above described signal generated at the missile is applied through an antenna (not shown) to R.F. amplifier 3.

R.F. amplifier 3 has its output signal applied to mixer 4. Also applied to mixer 4 is the output signal of stable local oscillator (L.O.) 5, this signal being chosen to be at frequency $f_{lo}$, a particular frequency between $f_o$ and $f_{sl}$. Mixer 4 has its output signal coupled to intermediate frequency (I.F.) amplifiers 6 and 7, the outputs of which are applied to mixer and selective I.F. amplifier stage 8. I.F. amplifiers 6 and 7 are tuned to pass signals at frequency $[(f_{sl}-f_{lo}) + °f_o]$ and $(f_{lo} - f_o)$, respectively, and mixer and I.F. amplifier stage 8 is tuned to pass a signal at $[(f_{sl} - f_o) + °f_o]$.

Assuming that no frequency shift rate exists between original carrier ($f_o$) and the lower sideband ($f_{sl}$), the sum of the IF output frequencies from stage 8 will always be: $(f_{sl}-f_{lo}) + (-f_o + f_{lo}) = (f_{sl}-f_o)$, or the original frequency separation between sideband and carrier. Now if the local oscillator drifts an amount $+ \Delta f_{lo}$, the sum of the I.F. output frequencies from stage 8 will be:

$[f_{sl} - (f_{lo} + \Delta f_{lo})] + [-f_o + (f_{lo} + \Delta f_{lo})]$, which is again equal to $(f_{sl} - f_o)$. From this it is apparent that the IF sum frequency is completely independent of LO stability providing the LO frequency, $f_{lo}$, always is between $f_o$ and $f_{sl}$ or $f_o$ and $f_{s2}$. This condition is readily obtained for fixed frequency operation.

Assuming, now, that the received signals are emanating from a missile in motion, the IF sum frequency is no longer a constant equal to $f_{sl} -f_o$ but is modified by a doppler shift rate, $°f_o$, due to missile acceleration, since the sidebands are varying in frequency with respect to the carrier. The output sum signal from stage 8 then becomes equal to $[(f_{sl} - f_o) + °f_o]$, and is applied to a conventional balanced mixer and oscillator stage 9, where it is heterodyned to a much lower frequency. This lower frequency, $f$, still displays the same rate of frequency shift, $°f_o$, as before mixing.

Mixer and oscillator stage 9 is connected to frequency multiplier 10 which multiplies the frequency of the signal applied thereto by a factor B to yield:

$$B (f + °f_o) = Bf + B°f_o.$$

Frequency multiplier 10, in turn, is connected both directly to mixer 11 and also through a crystal delay line 12 (an ultrasonic delay line), having a delay time $\Delta t$, to mixer 11. Frequency multiplier 10 is provided to permit the use of existing ultrasonic delay lines. The input signal, applied directly to mixer 11, is at a frequency:

$$Bf + B°f_o,$$

and the signal applied through delay line 12 to mixer 11 is at a frequency:

$$Bf + B°f_{o\Delta t},$$

where $°f_{o\Delta t}$ is the frequency of the doppler shift delayed a time $\Delta t$. Therefore, the output signal from mixer 11 includes a signal at frequency:

$$Bf + B°f_o - Bf - B°f_{o\Delta t} = B°f_o - B°f_{o\Delta t} = f^1,$$

where $f^1$ is defined as the doppler shift. This output signal is applied to narrow-band active filter 13, tuned to frequency $f^1$, which in turn applies its output signal to indicating means 14.

The single frequency surveillance system of FIG. 1 can be extended to a wide band surveillance system by substituting a sweeping local oscillator for stable oscillator 5 of FIG. 1. This wide band surveillance system is shown in FIG. 2.

The system of FIG. 2 permits detection of a particular signal over a wide frequency band. Except for the substitution of sweeping local oscillator 15 for stable local oscillator 5 of FIG. 1, the circuitry used in the system of FIG. 2 is the same as that used in the system of FIG. 1. Of course, a plurality of carrier frequencies is applied to the input of amplifier 3 for wide band surveillance, whereas only a single carrier frequency is applied to this amplifier for single frequency surveillance. Sweeping oscillator 15 comprises of a sweep generator 16, R.F. switch 17, low frequency switch 18, and oscillator 19. Oscillator 19, which may be a Raytheon Qk 518 carcinotron, is electronically tuned over its frequency range by adjustable sweep generator 16. In the absence of an input signal sweep generator 16 provides a sawtooth modulation to oscillator 19, thus sweeping the frequency of the oscillator output signal. In the presence of an input signal, generator 16 is disabled and the oscillator sweep ceases. The initial stop sweep signal is generated by R.F. switch 17. The input signals to switch 17 are the output signals from I.F. amplifiers 6 and 7. This initial stop sweep signal is of sufficient time duration to determine the presence or absence of a shift rate signal. If a shift rate signal is present, a voltage is generated in narrow band filter 13. This signal from filter 13 energizes low frequency switch 18. The output from switch 18 combines with the output from switch 17 to withhold sweep generator action for the duration of the shift rate signal. Thus, when the sweep ceases, a shift rate signal is being received and during this period the operation of the system of FIG. 2 is identical with the operation of the system of FIG. 1.

FIGS. 1 and 2 show preferred embodiments of the invention. Numerous modifications or alterations may be made to the preferred embodiments without departing from the spirit and scope of the invention as set forth in the appended claims.

What is claimed is:

1. In a doppler shift rate detector system having an input signal comprising a carrier frequency signal and a doppler shifted sideband signal: a first mixer; a radio frequency amplifier connected to said first mixer and having applied thereto said carrier frequency signal and said doppler shifted sideband signal; a stable local oscillator connected to said first mixer and applying thereto a signal having a frequency between said carrier signal frequency and said sideband signal frequency; a first and a second intermediate frequency amplifier connected to said first mixer and tuned to the frequency difference between the frequency of said sideband signal and said local oscillator signal, and to the frequency difference between the frequency of said local oscillator signal and said carrier signal, respectively; a mixer and intermediate frequency amplifier stage connected to said first and second intermediate frequency amplifiers to provide a signal at a frequency which is the difference between the frequencies of the input signals applied thereto; a mixer and oscillator stage connected to said mixer and intermediate frequency amplifier stage to receive the output signal therefrom and to heterodyne said signal to a much lower frequency; a frequency multiplier connected to said mixer and oscillator stage; a second mixer connected to said frequency multiplier; a delay line connected between said frequency multiplier and said mixer; an indicating means; and a narrow-band active filter connected between said second mixer and said indicating means to apply therebetween a signal representing the doppler shift rate.

2. A doppler shift rate detector system comprising: a first mixer; input means for simultaneously applying a carrier signal and a doppler shifted sideband signal to said first mixer; first and second intermediate frequency amplifiers coupled to said first mixer; a mixer and an intermediate frequency amplifier stage coupled to said first and second intermediate frequency amplifiers; a mixer and oscillator stage coupled to said mixer and intermediate frequency amplifier stage; a frequency multiplier coupled to said mixer and oscillator stage; a second mixer coupled to said frequency multiplier; a delay line having an input coupled to said frequency multiplier and an output coupled to said second mixer, a narrow-band active filter coupled to said second mixer; an indicating means coupled to said filter; a low frequency switch coupled to said filter; a R.F. switch coupled to said first and second intermediate amplifiers; a sweep generator coupled to said R.F. switch and to said low frequency switch; and a variable frequency oscillator coupled between said sweep generator and said first mixer.

3. In a doppler shift rate detector system having an input signal comprising a carrier signal at frequency $f_o$, and a lower sideband having a frequency $f_{sl}$ that is being doppler frequency shifted at a doppler shift rate of $^o\!f_o$ a radio frequency amplifier having applied thereto said carrier signal, said lower sideband signal and said doppler signal; a stable local oscillator providing a signal at frequency $f_{lo}$ chosen to be between frequencies $f_{sl}$ and $f_o$; a first mixer having connected thereto the outputs from said stable oscillator and said radio frequency amplifier; a mixer and intermediate frequency amplifier stage; first and second intermediate frequency amplifiers connected between said first mixer and said mixer and intermediate frequency amplifier stage, said first and second intermediate frequency amplifiers providing output signals at frequencies $[(f_{sl} - f_{lo}) + {}^o\!f_o]$ and $(f_{lo} - fo)$, respectively; a mixer and oscillator stage connected to said mixer and intermediate frequency amplifier stage to receive therefrom a signal at frequency $[(f_{sl} - f_o) + f_o]$ and to provide an output signal at frequency $(f + {}^o\!f_o)$, where $f$ is a lower frequency than $(f_{sl} - f_o)$; a frequency multiplier connected to said mixer and oscillator stage and having an output signal at frequency $Bf + B{}^o\!f_o$, where B is the frequency multiplication factor; a delay line connected to said frequency multiplier and having an output signal at frequency $Bf + B{}^o\!f_{o\Delta t}$, where ${}^o\!f_{o\Delta t}$ is the frequency of said doppler shift delayed a time $\Delta t$; a second mixer connected to said frequency multiplier and to said delay line and having an output signal at frequency $(B{}^o\!f_o - B{}^o\!f_{o\Delta t}) = f'$; a narrow-band filter connected to said second mixer and having an output signal at frequency $f'$ representing said doppler shift rate.

* * * * *